(12) United States Patent
Tanno et al.

(10) Patent No.: US 8,960,251 B2
(45) Date of Patent: *Feb. 24, 2015

(54) PNEUMATIC TIRE WITH INNER LINER LAYER HAVING MULTIPLICITY OF INTEGRALLY MOLDED INTERLOCKING ELEMENTS

(75) Inventors: Atsushi Tanno, Kanagawa (JP); Yuji Sato, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 673 days.

This patent is subject to a terminal disclaimer.

(21) Appl. No.: 12/450,217

(22) PCT Filed: Mar. 3, 2008

(86) PCT No.: PCT/JP2008/053779
§ 371 (c)(1),
(2), (4) Date: Sep. 16, 2009

(87) PCT Pub. No.: WO2008/126506
PCT Pub. Date: Oct. 23, 2008

(65) Prior Publication Data
US 2010/0018622 A1    Jan. 28, 2010

(30) Foreign Application Priority Data
Apr. 6, 2007 (JP) .................................. 2007-100800

(51) Int. Cl.
*B60C 5/14* (2006.01)
*B60C 5/00* (2006.01)
(Continued)

(52) U.S. Cl.
CPC ........ *B29D 30/0061* (2013.01); *B29D 30/0681* (2013.01); *B60C 5/00* (2013.01); *B60C 5/14* (2013.01); *B60C 19/002* (2013.01); *B60C 23/0493* (2013.01); *B29D 2030/0072* (2013.01)
USPC ................. 152/510; 24/442; 24/444; 24/452; 152/152.1; 152/450; 428/100

(58) Field of Classification Search
CPC ............ B60C 5/12; B60C 5/14; B60C 5/142; B60C 5/00; B60C 19/002; B60C 19/00; B60C 23/0493; B60C 2005/145; B60C 2005/147; B29F 30/0061; B29F 30/0681; B29F 2030/0072
USPC .......... 152/510, 450, 152.1; 24/452, 442, 444; 428/100
See application file for complete search history.

(56) References Cited

U.S. PATENT DOCUMENTS 3,101,517 A * 8/1963 Fox et al. ..................... 24/452 X
(Continued)

FOREIGN PATENT DOCUMENTS

| JP | 08-258506 A | 10/1996 |
|---|---|---|
| JP | 2004-163134 A | 6/2004 |
| JP | 2006-044503 A | 2/2006 |

OTHER PUBLICATIONS

English machine translation of JP 2006-44503 A, Feb. 16, 2006.*

*Primary Examiner* — Adrienne C. Johnstone
(74) *Attorney, Agent, or Firm* — Carrier Blackman & Associates, P.C.; Joseph P. Carrier; William D. Blackman

(57) ABSTRACT

A pneumatic tire designed so that when a hook and loop fastener is fitted to the tire internal face of a pneumatic tire furnished with an inner liner layer consisting of a thermoplastic elastomer composition of a blend of thermoplastic resin and elastomer, or a thermoplastic resin, the hook and loop fastener can easily follow the elongation of the inner liner layer and is free from damaging of the inner liner layer. There is disclosed a pneumatic tire furnished on its internal face with an inner liner layer (7) consisting of a thermoplastic elastomer composition composed of thermoplastic resin and elastomer, or a thermoplastic resin, characterized in that integral forming of a multiplicity of interlocking elements (8) protruding on the hollow side of the tire is effected on the surface of the inner layer (7).

6 Claims, 4 Drawing Sheets

(51) Int. Cl.
*B29D 30/00* (2006.01)
*B29D 30/06* (2006.01)
*B60C 19/00* (2006.01)
*B60C 23/04* (2006.01)

(56) References Cited

U.S. PATENT DOCUMENTS

| | | | |
|---|---|---|---|
| 3,192,589 A * | 7/1965 | Pearson | 24/452 |
| 3,261,069 A * | 7/1966 | Mathison | 24/452 X |
| 3,927,881 A * | 12/1975 | Lemelson et al. | 428/100 X |
| 4,371,023 A * | 2/1983 | Campagna | |
| 4,872,243 A * | 10/1989 | Fischer | 24/452 X |
| 5,720,646 A * | 2/1998 | Shannon et al. | 24/452 X |
| 5,938,869 A * | 8/1999 | Kaido et al. | 152/510 |
| 6,079,465 A * | 6/2000 | Takeyama et al. | 152/510 |
| 6,079,466 A * | 6/2000 | Watanabe et al. | 152/510 |
| 6,209,177 B1 * | 4/2001 | Murasaki | 24/452 |
| 6,391,414 B1 * | 5/2002 | Hjertman et al. | 428/100 X |
| 7,108,761 B2 * | 9/2006 | Bell | |
| 2009/0159172 A1 * | 6/2009 | Tanno et al. | |

* cited by examiner

PNEUMATIC TIRE WITH INNER LINER LAYER HAVING MULTIPLICITY OF INTEGRALLY MOLDED INTERLOCKING ELEMENTS

CROSS-REFERENCE TO RELATED APPLICATIONS

The present application is a U.S. National phase of, and claims priority based on PCT/JP2008/053779, filed 3 Mar. 2008, which, in turn, claims priority from Japanese patent applications 2007-100800, filed 6 Apr. 2007. The entire disclosure of each of the referenced priority documents is incorporated herein by reference.

TECHNICAL FIELD

The present invention relates to a pneumatic tire, and more specifically, to a pneumatic tire designed so that a hook and loop fastener for attaching such an accessory as an acoustic material is fitted to the tire internal face of a pneumatic tire furnished with an inner liner layer consisting of a thermoplastic elastomer composition of a blend of thermoplastic resin and elastomer, or a thermoplastic resin.

BACKGROUND ART

In a tubeless pneumatic tire, an inner liner layer consisting of butyl-based rubber having an excellent air-impermeable property is integrally lined to the tire internal face thereof as an air-permeation preventing layer. However, since the butyl-based rubber is heavy, Patent Document 1 proposes to use a thermoplastic resin having a small specific gravity or a thermoplastic elastomer composition containing the thermoplastic resin as a main component, in place of the butyl-based rubber.

Meanwhile, recently, for the purpose of improving the performance of a pneumatic tire, in a hollow portion, an acoustic material for reducing resonance that generates at the hollow portion is attached, or a sensor for detecting air pressure or temperature is attached. For example, as an attachment method of the acoustic material, there are proposed an attachment method by fixing a hook and loop fastener to the surface of an inner liner layer through the use of an adhesive, and an attachment method by providing an anchor element on the surface of the inner liner side of the hook and loop fastener to be fixed to the tire internal face (for example, see Patent Document 2)

However, for above-described tires fitted with an inner liner layer consisting of a thermoplastic elastomer composition containing thermoplastic resin as the main component, or a thermoplastic resin, there occurs a problem that, when fixing a hook and loop fastener to the inner liner layer using an adhesive or the like, the hook and loop fastener can not follow the elongation of the inner liner layer caused by expanding the diameter at the time of the vulcanization molding of the tire. In addition, when providing a hook and loop fastener with an anchor element to be fixed penetratingly to the tire internal surface, there was such problem that air permeation-preventing properties lower because it damages the inner liner layer.
Patent Document 1: Japanese patent application Kokai publication No. 8-258506
Patent Document 2: Japanese patent application Kokai publication No. 2006-44503

DISCLOSURE OF THE INVENTION

An object of the present invention is to provide a pneumatic tire designed so that when a hook and loop fastener is fitted to the tire internal face of a pneumatic tire furnished with an inner liner layer consisting of a thermoplastic elastomer composition of a blend of thermoplastic resin and elastomer, or a thermoplastic resin, the hook and loop fastener can easily follow the elongation of the inner liner layer and is free from damaging of the inner liner layer.

The pneumatic tire of the present invention for achieving the above purpose is one furnished with an inner liner layer consisting of a thermoplastic elastomer composition composed of thermoplastic resin and elastomer, or a thermoplastic resin, on its internal face and is characterized in that integral forming of a multiplicity of interlocking elements protruding on the hollow side of the tire is effected on the surface of said inner liner layer.

The interlocking element preferably has a height of from 0.5 to 5.0 mm.

It is favorable to arrange the interlocking elements in a region corresponding to the tread portion of the pneumatic tire and to load an acoustic material consisting of a porous material to these interlocking elements.

It is favorable to provide a multiplicity of anchor elements buried in the tire internal face in a protruding condition on the surface of the inner liner layer opposite to the interlocking elements.

The anchor elements are preferably integrally molded with the inner liner layer.

When the anchor elements are composed of a supporting portion connected to the inner liner layer and an widening portion at the front edge of the supporting portion, it is favorable to allow the width Wa of the supporting portion and the greatest width Wb of the widening portion to satisfy the formulae (1) and (2) below, while denoting the height of the anchor elements by H:

$$1.6 Wa \leq H \leq 3.8 Wa \tag{1}$$

$$2.0 Wa \leq Wb \leq 3.5 Wa \tag{2}$$

Further, when arranging the anchor elements intermittently, the thickness T of the anchor element preferably satisfies the formula (3) below relative to the width Wa:

$$0.7 Wa \leq T \leq 1.3 Wa \tag{3}$$

Furthermore, the height H of the anchor elements from the inner liner layer main body is favorably from 0.1 to 0.5 mm.

According to the present invention, in a pneumatic tire in which the inner liner layer is formed from a thermoplastic elastomer composition, or a thermoplastic resin, the interlocking elements of a hook and loop fastener are integrally molded with the inner liner layer, and therefore, it is possible to allow the interlocking elements to follow integrally to the elongation of the inner liner layer at the time of vulcanization molding and to leave the inner liner layer to be free from damage.

Figure 1:
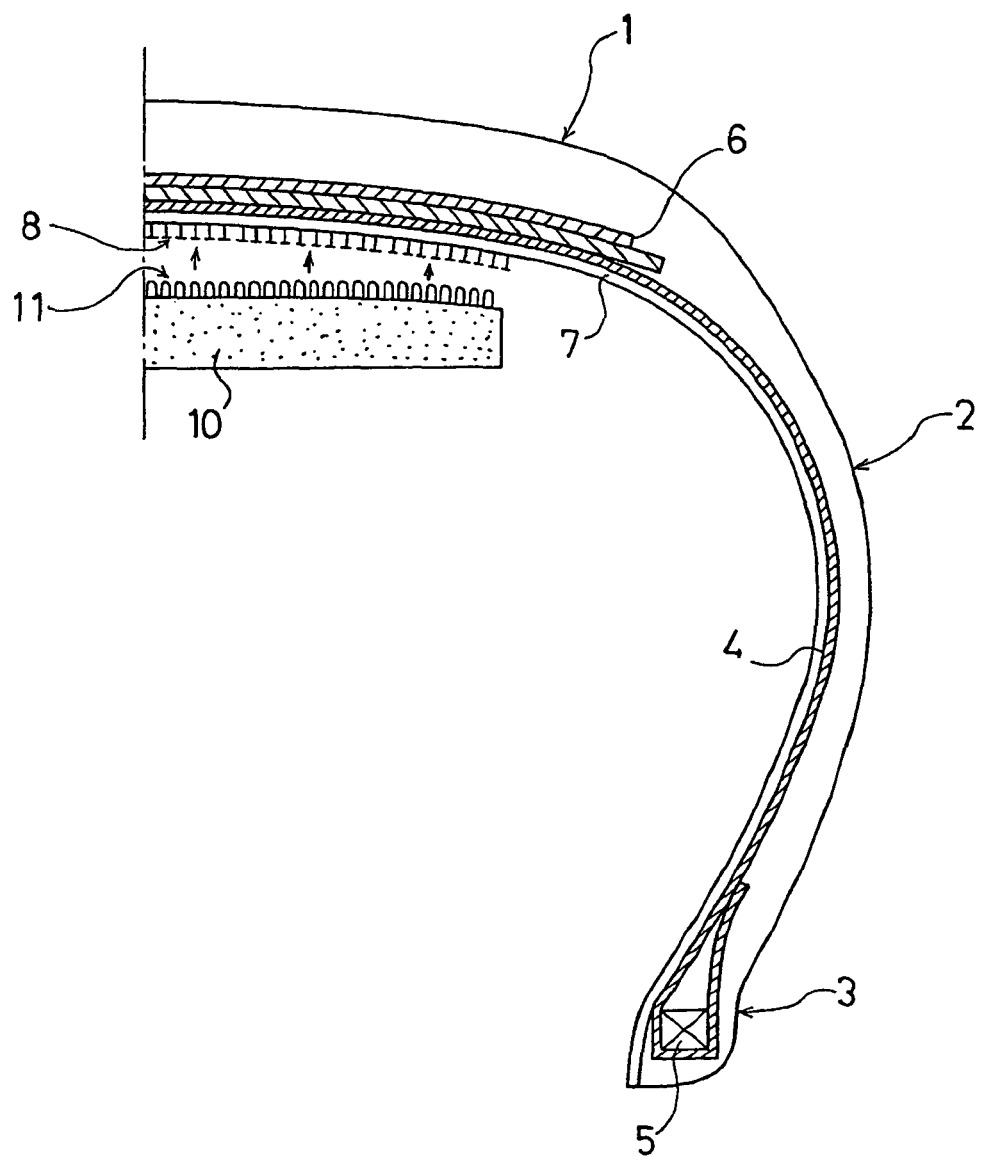
FIG. 1 is a half cross-sectional view in the tire meridional direction which shows one example of the embodiment of the pneumatic tire of the present invention.

4 carcass layer
4a carcass code
4b coating rubber
7 inner liner layer
8 interlocking element
9 anchor element
9a supporting portion
9b widening portion
10 acoustic material

DESCRIPTION OF THE PREFERRED EMBODIMENT

FIG. 1 is a half cross-sectional view in the tire meridional direction which shows one example of the embodiment of the pneumatic tire of the present invention.

In FIG. 1, 1 indicates a tread portion, 2 indicates a side wall portion, 3 indicates a bead portion, and 4 indicates a carcass layer. The carcass layer 4 is mounted between a pair of right and left bead cores 5 buried in the bead portion 3, and the both end portions thereof respectively are designed so as to be turned from the inside of the tire to the outside around bead core 5. Inside the tread portion 1, a pair of upper and lower belt layers 6 is arranged all the way around the tire outside the carcass layer 4. Further, on the innermost side of the tire, an inner liner layer 7 formed from a thermoplastic elastomer composition consisting of thermoplastic resin and elastomer, or a thermoplastic resin, is lined as the air permeation-preventing layer.

A multiplicity of interlocking elements 8 are integrally molded on the surface of the tire hollow side of the inner liner layer 7, and it is designed so that these interlocking elements 8 function as a hook and loop fastener and make it possible to fix removably such an accessory as an acoustic material 10 consisting of, for example, such a porous material as polyurethane foam. To the surface on the acoustic material side, a multiplicity of loops 11 removable relative to the interlocking elements 8 are provided as a hook and loop fastener on the other side.

The acoustic material 10 is composed of a porous material having sound-absorbing function, and when it is formed from a fiber structure consisting of a multiplicity of fibers, it can be joined directly because the structure itself has a multiplicity of loops.

Figure 2:
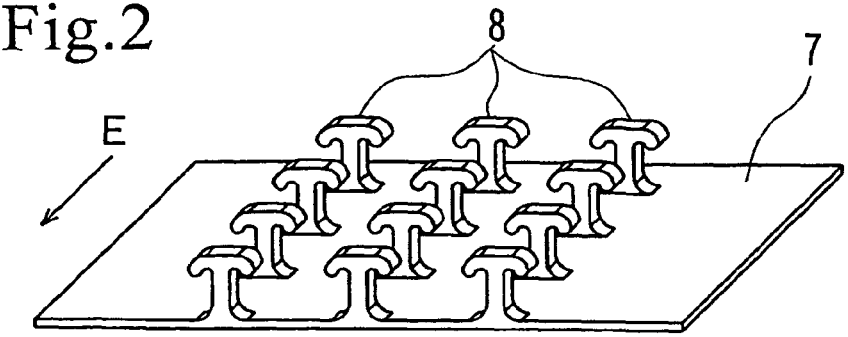
FIG. 2 is a perspective explanatory view which shows one example of the embodiment of the inner liner layer for use in the present invention.

On the surface of the inner liner layer 7, the interlocking elements 8 may be arranged intermittently in lines in vertical and transverse directions as shown in FIG. 2, or at random. When they are orderly arranged like the former, the column direction may be in the tire circumferential direction, or it may be in a tilted direction relative to the tire circumferential direction.

No particular limitation is imposed on the shape of the interlocking elements 8 only if the element exerts the function of interlocking with the hook and loop fastener and the like on the other side. The element may have a tabular shape of a T-letter or arrow by forming an widening portion at the front edge or distal end of a supporting portion erected on the surface of the inner liner layer, as exemplified in FIG. 2, and in addition, a fungus shape formed by rotating the supporting portion around the central axis thereof. In any case, the shape is preferably one capable of being integrally molded with the inner liner layer.

Since the interlocking elements 8 constituting the hook and loop fastener are integrally molded with the inner liner layer as describe above, the inner liner layer is not damaged and the air permeation-preventing property is not worsened, as in the case of sticking or joining another independent hook and loop fastener to the inner liner layer surface. Further, since the interlocking elements are integrally formed with the inner liner layer, they follow the elongation of the inner liner layer in the diameter-expanding process at the vulcanization molding and no trouble such as falling off occurs.

No particular limitation is imposed on the position for arranging the interlocking elements 8 on the tire internal face. The elements may be arranged on the whole surface of the internal face, or a part thereof. When attaching the acoustic material 10 in such a manner as exemplified in the drawing, they are preferably arranged in the region corresponding to the tread portion.

The arrangement density of the interlocking elements on the inner liner layer 7 is preferably from 12 to 90 pieces/cm$^2$. An arrangement density of the interlocking elements 8 less than 12 pieces/cm$^2$ can not give sufficient attaching strength of such an attaching member as the acoustic material 10, and the density more than 90 pieces/cm$^2$ may occasionally lead to too narrowed distance between widening portions of the interlocking elements 8 with each other to thereby result in such trouble in interlocking that loops of the hook and loop fastener on another side are hardly hooked.

No particular limitation is imposed on the protruding height of the interlocking elements 8 from the surface of the inner liner layer 7, but the height may preferably be from 0.5 to 5.0 mm. By setting the height of the interlocking elements 8 within the range, it is possible to make the attachment strength of such an accessory as the acoustic material sufficient.

Figure 3:
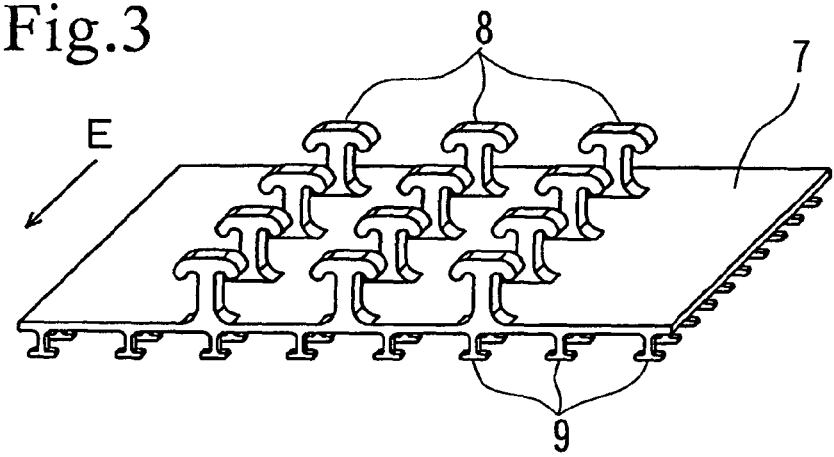
FIG. 3 is a perspective explanatory view which shows another example of the embodiment of the inner liner layer for use in the present invention.
Figure 4:
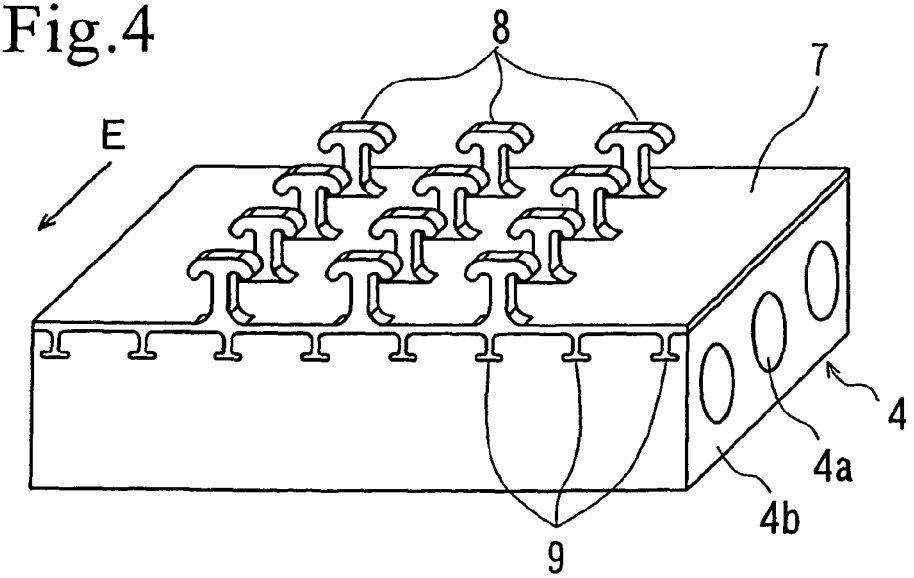
FIG. 4 is an explanatory view that exemplifies the cross-section of the cut inner liner layer and carcass layer of the pneumatic tire of the present invention which uses the inner liner layer in FIG. 3.

On the other hand, a method for sticking the inner liner layer to the tire internal face may also be performed by sticking it to the surface of the carcass layer 4 directly or through the use of an adhesive, but preferably, as shown in FIG. 3, it is favorable to provide a multiplicity of anchor elements 9 in a protruding condition to the surface opposite to the surface on which the interlocking elements 8 are formed, and to bury these multiplicity of anchor elements 9 in a coating rubber 4b of the carcass layer 4 covering and extending between a plurality of carcass cords 4a, as shown in FIG. 4. The inner liner layer composed of a thermoplastic elastomer composition or a thermoplastic resin has poor adhesion to rubber, but by employing such constitution, it is possible to improve the joint strength between the inner liner layer and the tire internal surface. Further, an adhesive rubber layer may be laid between the inner liner layer 7 and the carcass layer 4.

The arrangement of the anchor elements 9 on the surface of the inner liner layer 7 may be intermittent in lines in vertical and transverse directions as is the case for the interlocking elements 8, or may be random. When they are orderly arranged like the former, the column direction may be in the tire circumferential direction, or it may be in a tilted direction relative to the tire circumferential direction.

No particular limitation is imposed on the shape of the anchor elements 9, if the element has an anchor function. As is the case with the interlocking elements 8, the shape of the anchor elements 9 having a widening portion formed at the front edge or distal end of the supporting portion erecting on the surface of the inner liner layer, and, in addition, the one formed by processing the side surface of the supporting portion into a saw-tooth configuration may be employed. But, preferably, one composed of a supporting portion and a widening portion at the front edge is favorable. The anchor elements 9 are not limited to ones formed in a shape of independent spots as the example shown in the drawing, but may be ones continuously formed in a rail shape (projecting strip).

Figure 5A:
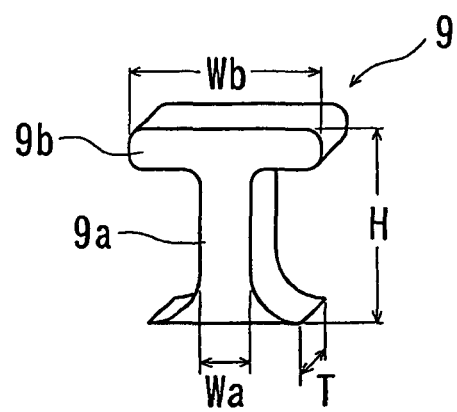
FIG. 5A to 5C are perspective explanatory views which show examples of the embodiment of the anchor element provided in a protruding condition on the inner liner layer for use in the present invention.
Figure 5B:
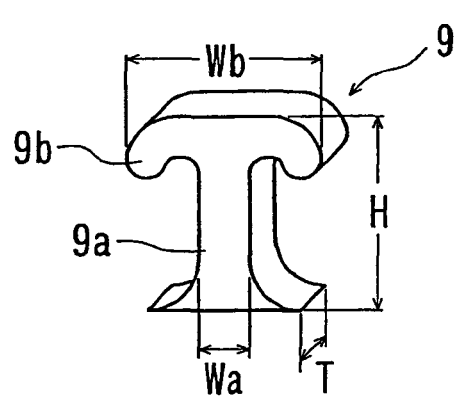
Figure 5C:
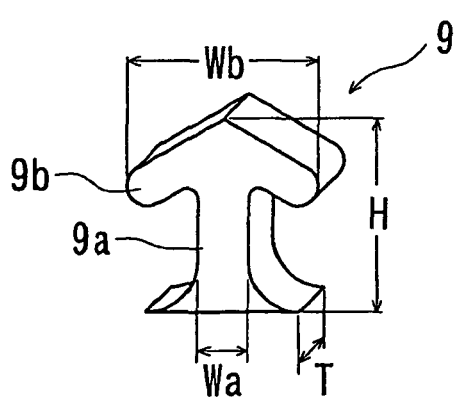

FIG. 5A to 5C exemplify preferable shapes of the anchor elements 9, which are composed of the supporting portion 9a and the widening portion 9b at the front edge. FIG. 5A and FIG. 5B show the cross-sectional shape of a T letter shape, and FIG. 5C shows the cross-sectional shape of an arrow shape. In all cases, after entering an unvulcanized rubber layer and then the vulcanization processing, the widening portion 9b becomes hardly extractable to exert an anchor effect. Although examples as shown in the drawing have a flat plate shape, a shape of a fungus formed by rotating the supporting portion around the central axis may also be employed.

In the anchor elements 9 having the shapes of FIG. 5A to FIG. 5C, when denoting the height from the inner liner layer 7 by H, the width Wa of the supporting portion 9a, and the greatest width Wb of the widening portion 9b, preferably have the relation of the formulae (1) and (2) below:

$$1.6Wa \leq H \leq 3.8Wa \quad (1)$$

$$2.0Wa \leq Wb \leq 3.5Wa \quad (2)$$

Further, when the anchor elements 9 are tabular shape and are in a spot, the thickness T of the supporting portion 9a and the width Wa preferably satisfies the relation of the formula (3) below:

$$0.7Wa \leq T \leq 1.3Wa \quad (3)$$

When the width Wa and the thickness T of the supporting portion 9a are too small, the rigidity of the supporting portion 9a lowers and it is likely to break easily, and when they are too great, it becomes difficult to enter unvulcanized rubber. Further, when the greatest width Wb of the widening portion 9b is too small relative to the width Wa of the supporting portion 9a, the joint strength-enhancing effect cannot be sufficiently obtained, and when it is too great, it becomes difficult to enter unvulcanized rubber.

The height H of the anchor element 9 may preferably be from 0.1 to 0.5 mm. When the height H is less than 0.1 mm, the joint strength with the carcass layer can not be sufficiently obtained, and when it is above 0.5 mm, it may occasionally touch the carcass code to thereby lower the durability.

The anchor elements 9 on the inner liner layer 7 have arrangement densities of preferably 2 to 60 pieces/cm². When the arrangement density of the anchor elements is too small, the joint strength cannot be sufficiently obtained, and even if it is too great, the joint strength is also lowered, unpreferably.

The anchor elements 9 are preferably provided in a protruding condition on the whole surface of the inner liner layer 7, but they do not always have to be provided on the whole surface. For example, anchor elements are provided in regions corresponding to the tread portion and/or bead portion of a pneumatic tire, and are not provided in other regions, or an adhesive rubber layer may be interposed. Further, in a shoulder region or the like which is susceptible to great shear deformation, the anchor element and the adhesive rubber layer may be used at the same time.

Figure 6:
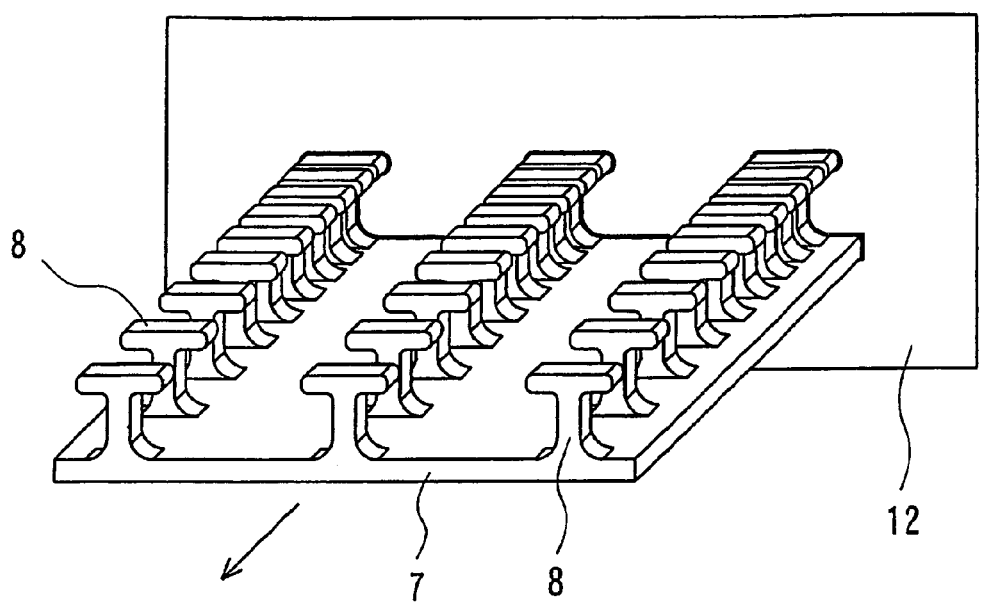
FIG. 6 is a perspective explanatory view which shows one example of molding process of the inner liner layer for use in the present invention.

In the present invention, although no particular limitation is imposed on a method for integrally molding the inner liner layer and the interlocking element, but for example, as shown in FIG. 6, by extruding a thermoplastic elastomer composition consisting of thermoplastic resin and elastomer, or a thermoplastic resin, from a die 12 of an extruder so that the inner liner layer 7 and the projecting strips of interlocking elements stand parallel, forming slits on the projecting strips of interlocking elements in a crossing direction intermittently at small pitches, and then performing stretching processing, it is possible to form into a shape in which a multiplicity of independent interlocking elements are arranged isolatedly and intermittently in the stretching direction.

As described above, by integrally molding the interlocking elements with the inner liner layer, it is possible to improve productivity and improve air permeation-preventing performance. In addition, the inner liner layer main body may be extruded in a cylindrical shape, subjected to inflation molding to be formed into a cylindrical film.

No particular limitation is imposed on a method for providing the anchor elements in a protruding condition relative to the inner liner layer. The anchor elements molded separately from the inner liner layer may be adhered or implanted to the layer, or the interlocking elements and the anchor elements may be integrally molded when molding the inner liner layer. Particularly, integral molding of the anchor elements with the interlocking elements and inner liner layer improves the productivity and improves the air permeation-preventing performance, preferably.

Regarding the method for integrally molding the anchor elements with the interlocking elements and inner liner layer, it may be molded in the same manner as the method for integrally molding the interlocking elements and inner liner layer. For example, it is favorable to perform the molding by using a die for forming the interlocking element on one surface of the inner liner layer and forming the anchor element on the opposite surface. Meanwhile, upon molding the anchor element, by performing the extrusion in a projecting shape from a die so as to line parallel, and directly stretching them without forming slits, the anchor element can be formed in a continuous projecting strip shape.

Examples of thermoplastic resin for forming the inner liner layer include polyamide-based resins [for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6, nylon 6T, nylon 6/6T copolymer, nylon 66/PP copolymer, and nylon 66/PPS copolymer], polyester-based resins [for example, aromatic polyesters such as polybutylene terephthalate (PBT), polyethylene terephthalate (PET), polyethylene isophthalate (PEI), polybutylene terephthalate/tetramethylene glycol copolymer, PET/PEI copolymer, polyarylate (PAR), polybutylene naphthalate (PBN), liquid crystalline polyester, and polyoxyalkylene diimidic acid/polybutylene terephthalate copolymer], polynitrile-based resins [for example, polyacrylonitrile (PAN), polymethacrylonitrile, acrylonitrile/styrene copolymer (AS), methacrylonitrile/styrene copolymer, and methacrylonitrile/styere/butadiene copolymer], poly(meth)acrylate-based resins [for example, polymethyl methacrylate (PMMA), polyethyl methacrylate, ethylene/ethyl acrylate copolymer (EEA), ethylene/acrylic acid copolymer (EAA), and ethylene methyl acrylate resin (EMA)], polyvinyl-based resins [for example, vinyl acetate (EVA), polyvinyl alcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methyl acrylate copolymer], cellulose-based resins [for example, cellulose acetate, and cellulose acetate butyrate], fluororesins [for example, polyvinylidene fluoride (PVDF), polyvinyl fluoride (PVF), polychlorofluoroethylene (PCTFE), and tetrafluoroethylene/ethylene copolymer (ETFE)], and imide-based resins [for example, aromatic polyimide (PI)].

The thermoplastic elastomer composition for forming the inner liner layer is consisting of the above-described resin and an elastomer. The composition ratio of the thermoplastic resin and the elastomer may be suitably determined based on the balance of the thickness and flexibility of the inner liner layer, and is preferably within the range of 10/90 to 90/10 (weight ratio), and more preferably 20/80 to 85/15.

Examples of elastomers constituting such a thermoplastic elastomer composition include diene-based rubbers and hydrogenated products thereof [for example, NR, IR, epoxidized natural rubber, SBR, BR (high-cis BR and low-cis BR), NBR, hydrogenated NBR, and hydrogenated SBR], olefin-based rubbers [for example, ethylene propylene rubber (EPDM, EPM), and maleic acid-modified ethylene propylene rubber (M-EPM)], butyl rubber (IIR), isobutylene/aromatic vinyl or diene-based monomer copolymer, acrylic rubber (ACM), ionomer, halogen-containing rubbers [for example, Br-IIR, Cl-IIR, brominated product of isobutylene-paramethyl styrene copolymer (Br-IPMS), chloroprene rubber (CR), hydrin rubber (CHC, CHR), chlorosulfonated polyethylene (CSM), chlorinated polyethylene (CM), and maleic acid-modified chlorinated polyethylene (M-CM)], silicone rubbers [for example, methyl-vinyl silicone rubber, dimethyl silicone rubber, and methyl-phenyl-vinyl silicone rubber], sulfur-containing rubbers [for example, polysulfide rubber], fluororubbers [for example, vinylidene fluoride-based rubber, fluorine-containing vinyl ether-based rubber, tetrafluoroethylene-propylene-based rubber, fluorine-containing silicon-based rubber, and fluorine-containing phosphazene-based rubber], and thermoplastic elastomers [for example, styrene-based elastomer, olefin-based elastomer, polyester-based elastomer, urethane-based elastomer, and polyamide-based elastomer].

The base material of the inner liner layer, interlocking elements, and the anchor elements may be composed of the same material, or different materials, and when different materials are used, two-color molding is preferable.

What is claimed is:

1. A pneumatic tire comprising:
    a tread portion and a carcass layer, the carcass layer comprising a plurality of carcass cords and a coating rubber covering and extending between the carcass cords;
    an innermost, air permeation-preventing liner layer disposed inside of the carcass layer in a tire radial direction, said liner layer composed of either a thermoplastic resin or a thermoplastic elastomer composition consisting of a thermoplastic resin and an elastomer, said liner layer being either directly adjacent to the carcass layer or separated from the carcass layer only by an adhesive layer,
    wherein a multiplicity of interlocking elements protruding to the hollow side of the tire are integrally molded on the surface of said inner liner layer, and wherein the liner layer further comprises a multiplicity of anchor elements integrally molded with said inner liner layer and provided in a protruding condition on the surface of said inner liner layer opposite to said interlocking elements, said anchoring elements buried in said coating rubber of the carcass layer and helping to anchor said inner liner layer and said carcass layer together, and
    wherein each of the interlocking elements and the anchor elements, respectively, comprises a supporting portion and a widening portion, the supporting portion being erected on a surface of the inner liner layer, and the widening portion being formed at a distal end of the supporting portion.

2. The pneumatic tire according to claim 1, wherein said interlocking element has a height of 0.5 to 5.0 mm.

3. The pneumatic tire according to claim 1, wherein said interlocking elements are arranged in a region corresponding to the tread portion of said pneumatic tire, and these interlocking elements are loaded with an acoustic material consisting of a porous material.

4. The pneumatic tire according to claim 1, wherein the relation of the width Wa of said supporting portion of the anchor element and the greatest width Wb of said widening portion of the anchor element satisfies the formulae (1) and (2) below, while denoting the height of the anchor element by H:

$$1.6Wa \leq H \leq 3.8Wa \quad (1)$$

$$2.0Wa \leq Wb \leq 3.5Wa \quad (2).$$

5. The pneumatic tire according to claim 4, wherein the thickness T of said anchor element satisfies the formula (3) below relative to said width Wa:

$$0.7Wa \leq T \leq 1.3Wa \quad (3).$$

6. The pneumatic tire according to claim 1, wherein each of said anchor elements has a height H in a range of 0.1 to 0.5 mm.

* * * * *